United States Patent
Bauer et al.

(10) Patent No.: US 6,832,672 B2
(45) Date of Patent: Dec. 21, 2004

(54) HYDRAULIC CLUTCH WITH A TURBINE TORSIONAL VIBRATION DAMPER

(75) Inventors: Thomas Bauer, Grossbardorf (DE); Peter Frey, Gerolzhofen (DE); Ralf Rönnebeck, Schonungen (DE)

(73) Assignee: ZF Sachs AG, Schweinfurt (DE)

( * ) Notice: Subject to any disclaimer, the term of this patent is extended or adjusted under 35 U.S.C. 154(b) by 2 days.

(21) Appl. No.: 10/271,067

(22) Filed: Oct. 15, 2002

(65) Prior Publication Data

US 2003/0075410 A1 Apr. 24, 2003

(30) Foreign Application Priority Data

Oct. 22, 2001 (DE) .......................................... 101 52 007

(51) Int. Cl.⁷ .............................................. F16H 45/02
(52) U.S. Cl. ................... 192/3.29; 192/70.17; 192/212
(58) Field of Search .................... 192/329, 3.3, 212, 192/110 B, 70.17; 464/64

(56) References Cited

U.S. PATENT DOCUMENTS

| | | | | |
|---|---|---|---|---|
| 5,533,602 A | * | 7/1996 | Worner et al. | 192/3.29 |
| 5,681,221 A | * | 10/1997 | Albers et al. | 464/64 |
| 6,062,359 A | * | 5/2000 | Rohs et al. | 192/3.29 |
| 6,079,529 A | * | 6/2000 | Hinkel et al. | 192/3.29 |
| 6,123,178 A | * | 9/2000 | Hinkel | 192/3.29 |
| 6,478,127 B2 | * | 11/2002 | Fukushima | 192/3.29 |
| 6,564,914 B1 | * | 5/2003 | Glock et al. | 192/3.29 |
| 2001/0020563 A1 | * | 9/2001 | Sasse et al. | 192/3.28 |
| 2001/0027286 A1 | * | 10/2001 | Schrodeer | 192/3.29 |
| 2001/0032767 A1 | * | 10/2001 | Reinhart et al. | 192/3.29 |
| 2003/0075409 A1 | * | 4/2003 | Bauer et al. | 192/3.29 |
| 2003/0217902 A1 | * | 11/2003 | Kuwahara | 192/3.29 |

FOREIGN PATENT DOCUMENTS

GB 2271411 * 10/1993 ............. F16D/3/12

* cited by examiner

*Primary Examiner*—Saul Rodriguez
(74) *Attorney, Agent, or Firm*—Cohen, Pontani, Lieberman & Pavane

(57) ABSTRACT

A hydraulic clutch has an impeller wheel, a turbine wheel with a turbine wheel shell, a turbine torsional vibration damper and a lockup clutch. The turbine wheel shell receives a connection element with which it acts on the torsional vibration damper. The lockup clutch has at least one clutch disk arranged at a disk carrier. The turbine wheel shell is connected on the radial inner side with the connection element. The disk carrier passes into a holding clamp which is connected to the turbine wheel shell in a radially eccentric manner. The disk carrier is connected with the connection element so as to be fixed with respect to rotation relative to it.

29 Claims, 4 Drawing Sheets

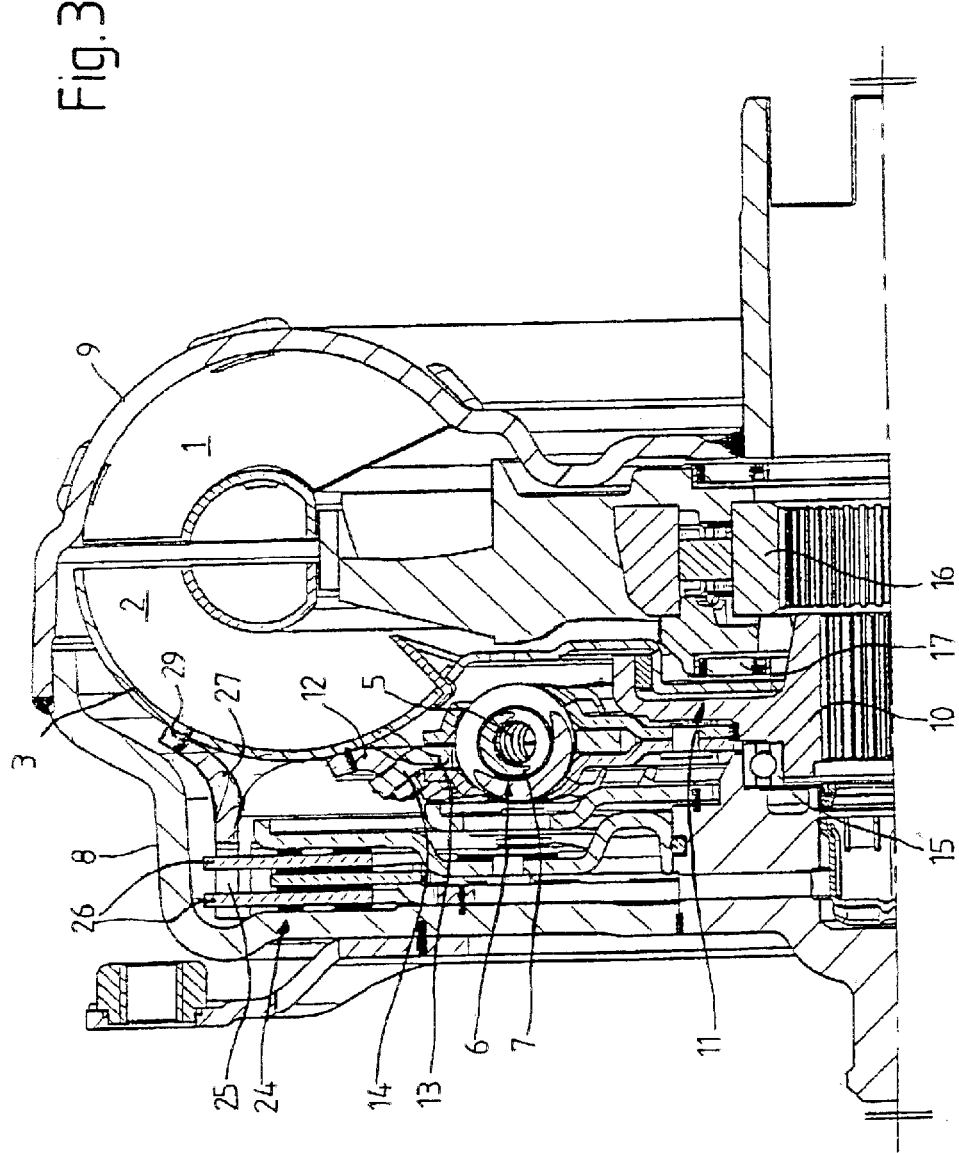

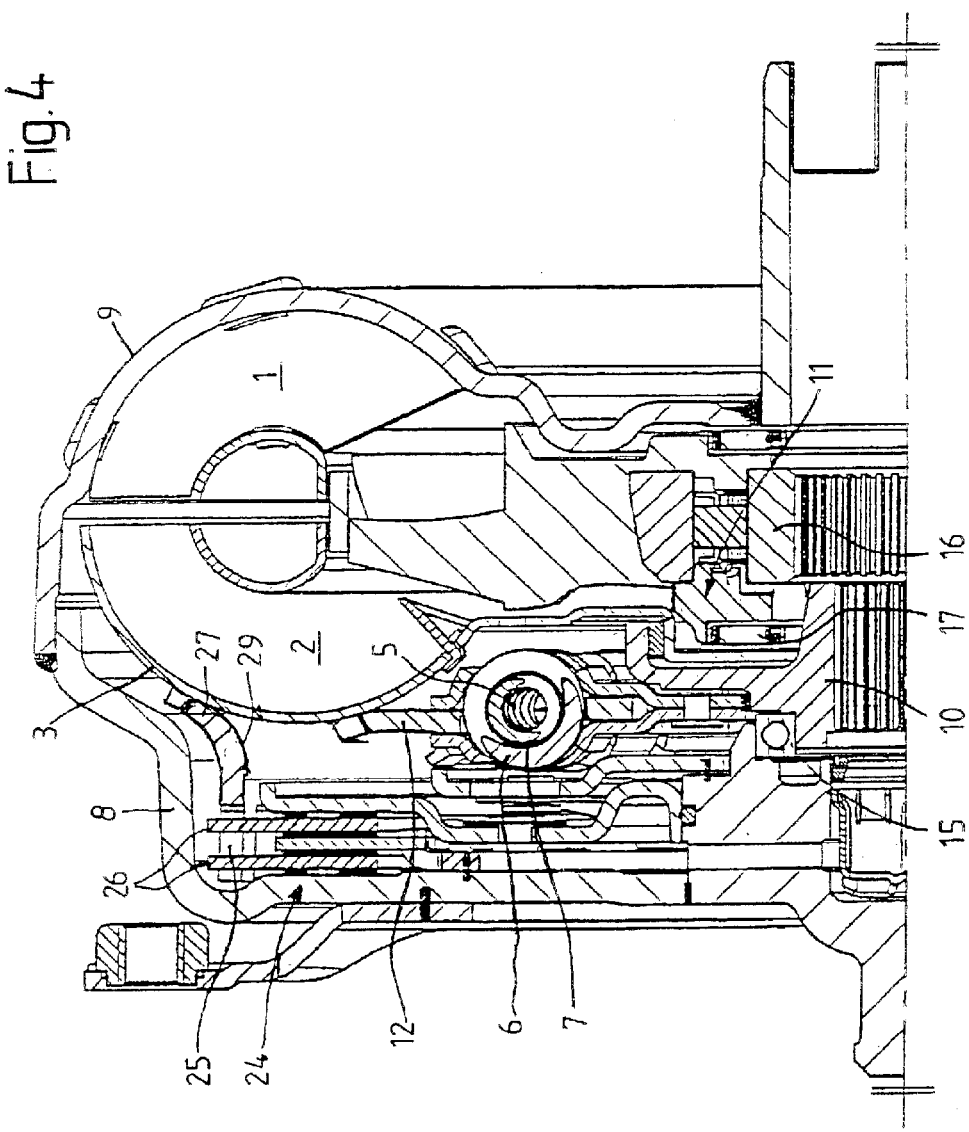

HYDRAULIC CLUTCH WITH A TURBINE TORSIONAL VIBRATION DAMPER

BACKGROUND OF THE INVENTION

1. Field of the Invention

The present invention is directed to a hydraulic clutch with an impeller wheel, a turbine wheel with a turbine wheel shell, a torsional vibration damper, and a lockup clutch.

2. Description of the Related Art

DE 43 33 562 A1 discloses a hydraulic clutch of the type mentioned above, wherein the turbine wheel is drivable by the impeller wheel, and the turbine wheel shell is mounted so as to be rotatable with respect to a turbine wheel hub. The torsional vibration damper is arranged on the turbine wheel hub so as to be fixed with respect to rotation relative to it for driving the turbine wheel hub. A connection element is arranged at the turbine wheel shell and, along with the latter, acts on the torsional vibration damper. The connection element is in an operative connection with the lockup clutch, and the lockup clutch has at least one clutch disk arranged at a disk carrier.

The hydraulic clutch of the prior art already operates quite satisfactorily, but is still capable of improvement. In particular, it requires a relatively large volume.

SUMMARY OF THE INVENTION

It is the object of the present invention to design a hydraulic clutch of the type mentioned above which can be realized in a more compact manner while carrying out its function equally well or better.

This object is met in that the turbine wheel shell receives the connection element in a connection area which is arranged farther inside radially than a turbine wheel shell area in which the turbine wheel shell has its farthest axial extension and the disk carrier passes into a holding clamp which is connected to the turbine wheel shell in a holding area which differs from the turbine wheel shell area.

Alternatively, the holding area can be arranged farther radially outside or farther radially inside than the turbine wheel shell area.

The holding clamp and/or the connection element are/is preferably welded to the turbine wheel shell. When welding the holding clamp on the radial inner side, it is even possible to weld the connection element and the holding clamp to the turbine wheel shell along a common weld.

When the torsional vibration damper is arranged on the radial inner side, the hydraulic clutch is particularly compact.

When the torsional vibration damper has at least two spring assemblies which are nested concentrically one inside the other, a large spring constant of the torsional vibration damper can be realized in spite of the compact construction.

The connection element can engage directly in the torsional vibration damper. Alternatively, the connection element can act on an engagement element which engages in the torsional vibration damper. In this case, the connection element is interlocked with the engagement element, for example.

When the engagement element has a bend, the hydraulic clutch can be implemented in a more compact manner.

When the holding clamp has a radial bend, the construction volume of the hydraulic clutch can be reduced even more while retaining the same efficiency.

Especially high torques can be transmitted by the lockup clutch when the lockup clutch has a plurality of clutch disks arranged axially one behind the other.

A rolling bearing is preferably arranged between the turbine wheel hub and a drive-side housing element. In particular, the rolling bearing can be constructed as a grooved ball bearing.

Also, a rolling bearing is preferably arranged between the turbine wheel shell and a stator wheel hub. When this rolling bearing is constructed as a needle bearing, it requires a particularly small installation space, especially axial installation space.

When the bearing support has an axial and/or radial sliding bearing, it can be implemented in a particularly economical and space-saving manner.

When the rolling bearing arranged between the turbine wheel shell and stator wheel hub is arranged at the height of the axial sliding bearing, no shear moment or tilting moment is exerted on the turbine wheel shell by these two bearings.

When the turbine wheel shell and the turbine wheel hub have a small distance from one another in the area of the turbine wheel hub in a first portion and a large distance from one another in a second portion and the axial sliding bearing is arranged in the second portion, the hydraulic clutch has an even smaller axial extension. The second portion is preferably arranged farther inside radially than the first portion.

When the turbine wheel shell in the area of the radial sliding bearing extends farther inward radially than the turbine wheel hub, the hydraulic clutch can be constructed in a more compact manner and operates particularly reliably.

Compactness can be increased even more when the turbine wheel shell in the area of the radial sliding bearing has a curve directed away from the radial sliding bearing.

In a particularly advantageous arrangement of the two sliding bearings relative to one another, the axial sliding bearing is radially and/or axially offset relative to the radial sliding bearing. The axial sliding bearing preferably extends farther inward radially in relation to the radial sliding bearing. Further advantages and details are given in the following description of an embodiment example in connection with the drawings.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 3 is a partial axial section view of a second embodiment of torque converter; and FIG. 4 is a partial axial section view of a third embodiment of torque converter.

DETAILED DESCRIPTION OF THE PRESENTLY PREFERRED EMBODIMENTS

Figure 1:
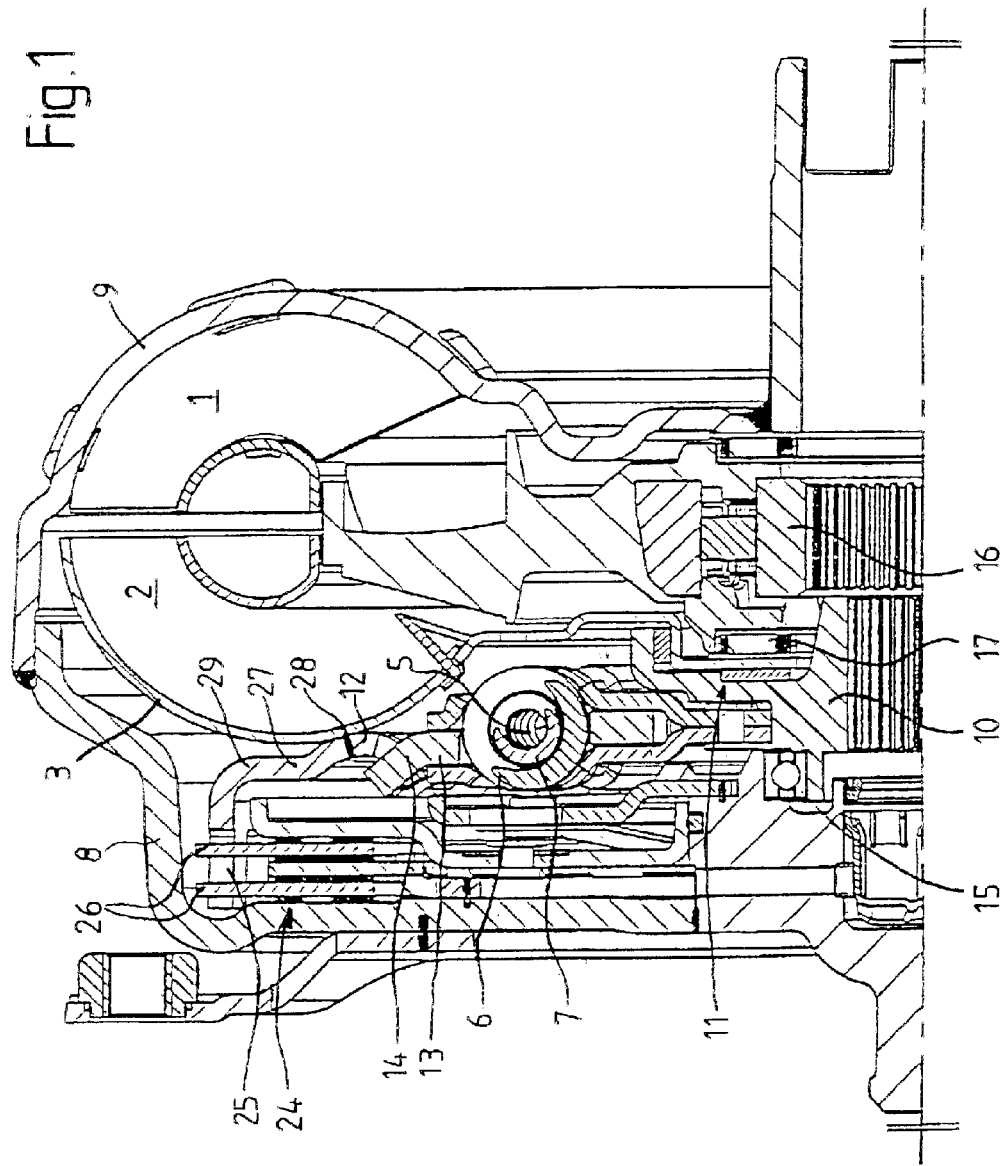
FIG. 1 is a partial axial section view of a hydraulic clutch in the form of a torque converter.

According to FIG. 1, a torque converter has an impeller wheel 1, a turbine wheel 2 with a turbine wheel shell 3, a stator wheel 4 and a torsional vibration damper 5. As can be seen, the torsional vibration damper 5 is arranged on the radial inner side. It has two spring assemblies 6, 7 which are nested concentrically one inside the other.

As is generally common, a drive shaft, not shown for the sake of clarity, e.g., the crankshaft of an internal combustion engine, can be connected to a drive-side housing element 8 so as to be fixed with respect to rotation relative to it. The drive-side housing element 8 is connected, e.g., welded, to an impeller wheel shell 9. The turbine wheel 2 can be driven by the impeller wheel 1.

The torsional vibration damper is arranged on a turbine wheel hub 10 so as to be fixed with respect to rotation relative to it. The turbine wheel hub 10 can be driven by the turbine wheel 2 by means of the torsional vibration damper and the turbine wheel shell 3.

The turbine wheel shell 3 is mounted in a bearing 11 so as to be rotatable with respect to the turbine wheel hub 10. A connection element 12 is arranged at the turbine wheel shell 3. According to FIG. 1, it is welded to the turbine wheel shell 3. The turbine wheel shell 3 acts on the torsional vibration damper 5 by means of the connection element 12. The torsional vibration damper 5 accordingly acts as a turbine torsional vibration damper.

According to FIG. 1, the connection element 12 is received at the radial inner side by the turbine wheel shell 3. According to FIG. 1, the connection element 12 is welded to the turbine wheel shell 3. By "radial inner side" is meant that the connection element 12 is received in a connection area of the turbine wheel shell 3 which is arranged farther inward radially than a turbine wheel shell area in which the turbine wheel shell 3 has its farthest axial extension.

Further, the connection element 12 does not engage directly in the torsional vibration damper 5, but rather interlocks with an engagement element 13 which engages in the torsional vibration damper 5. The connection element 12 accordingly acts directly only on the engagement element 13. In order to realize a more compact constructional form of the torque converter, the engagement element 13 has a bend 14.

Figure 2:
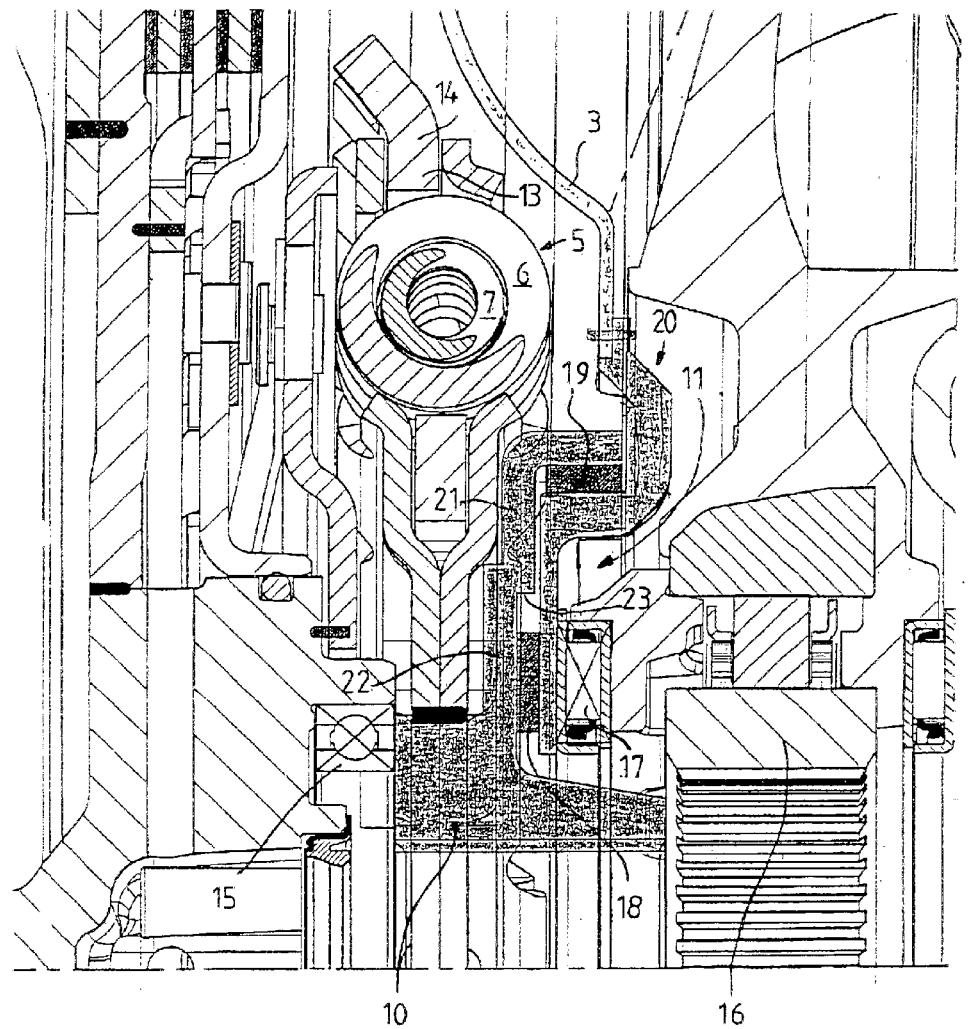
FIG. 2 shows a detail from FIG. 1.

Further, as will be seen from FIG. 1 and even more clearly from FIG. 2, a first rolling bearing 15 is arranged between the turbine wheel hub 10 and the drive-side housing element 8. A second rolling bearing 17 is arranged between the turbine wheel shell 3 and a stator wheel hub 16. The first rolling bearing 15 is constructed as a grooved ball bearing; the second rolling bearing 17 is constructed as a needle bearing.

According to FIG. 2, the bearing support 11 has an axial sliding bearing 18 and a radial sliding bearing 19 which is a different structural component part. The axial sliding bearing 18 has a radial and axial offset relative to the radial sliding bearing 19. As can be seen, the axial sliding bearing 18 extends farther radially inward relative to the radial sliding bearing 19. The bearing 11 is accordingly constructed as an axial and radial sliding bearing 18, 19.

In the area of the radial sliding bearing 19, the turbine wheel shell 3 extends farther inward radially than the turbine wheel hub 10. Further, the turbine wheel shell 3 has a curve 20 in this area which is directed away from the radial sliding bearing 19.

The turbine wheel shell 3 and the turbine wheel hub 10 are at a short distance from one another in the area of the turbine wheel hub 10 in a first portion 21. They are at a large distance from one another in a second portion 22 which is arranged farther radially inside. This is achieved in that the turbine wheel hub 10 has a step 23 which forms the transition from the first portion 21 to the second portion 22. The axial sliding bearing 18 is arranged in the second portion 22. The needle bearing 17 is accordingly arranged at the height of the axial sliding bearing 18 as can be seen.

Further, the torque converter has a lockup clutch 24. The lockup clutch 24 and the connection element 12 are in an operative connection with one another. For this purpose, the lockup clutch 24 has a disk carrier 25 at which at least one clutch disk 26 is arranged. According to FIG. 1, the lockup clutch 24 even has a plurality of clutch disks 26 which are arranged one behind the other axially, the disks 26 being axially movable and rotationally substantially fixed with respect to the disk carrier. The disk carrier 25 is connected with the connection element 12 so as to be fixed with respect to rotation relative to it.

In order to connect the disk carrier 25 with the connection element 12 so as to be fixed with respect to rotation relative to it, the disk carrier 25 passes into a holding clamp 27 which is welded to the turbine wheel shell 3 in a radially eccentric manner. According to FIG. 1, the holding clamp 27 is connected to the turbine wheel shell 3 at the radial inner side. According to FIG. 1, the holding clamp 27 is welded to the turbine wheel shell 3. By "radial inner side" is meant that the connection to the turbine wheel shell 3 is carried out in a holding area which is arranged farther radially inward than the turbine wheel shell area in which the turbine wheel shell has its farthest axial extension. According to FIG. 1, the welding is carried out along a weld 28 by which the connection element 12 is also welded to the turbine wheel shell 3. In order to achieve the weld 28 at the radial inner side, the holding clamp 27 has a radially inwardly directed radial bend 29.

The torque converters shown in FIGS. 3 and 4 correspond essentially to the torque converter described in connection with FIGS. 1 and 2. In contrast to the torque converter according to FIGS. 1 and 2, however, the holding clamp 27 shown in FIGS. 3 and 4 is welded to the turbine wheel shell 3 at the radial outer side. The radial bend 29 is therefore directed radially outward in this case. By "radially outward" is meant that the holding area in which the holding clamp 27 is connected to the turbine wheel shell 3 is arranged farther outward radially than the turbine wheel shell area in which the turbine wheel shell has its farthest axial extension. Further, in the embodiment form according to FIG. 4, the connection element 12 engages directly in the torsional vibration damper 5. An engagement element 13 which differs from the connection element 12 is not used in this embodiment form.

An extremely compact construction can be realized by means of the torque converter according to the invention. In addition, the turbine wheel 2 and the turbine wheel shell 3 are reinforced by the weld 28 (or welds, if welded separately).

The invention is not limited by the embodiments described above which are presented as examples only but can be modified in various ways within the scope of protection defined by the appended patent claims.

We claim:

1. A hydraulic clutch comprising
    an impeller wheel which can be driven to rotate about an axis of rotation,
    a turbine wheel hub on said axis,
    a turbine wheel which can be driven to rotate with respect to said hub by said impeller wheel, said turbine wheel comprising a turbine wheel shell having a farthest axial extension which is radially spaced from said axis, a torsional vibration damper arranged on said turbine wheel hub and fixed against rotation with respect to said turbine wheel hub, said torsional vibration damper being arranged radially inside of said farthest axial extension of said turbine wheel shell, a connection element fixed to said turbine wheel shell radially inward from said farthest axial extension and acting on said torsional vibration damper for driving said turbine wheel hub, and a lockup clutch arranged to form a drive connection between said impeller wheel and said turbine wheel, said lockup clutch comprising a disk carrier carrying at least one clutch disk, said disk carrier being formed with a holding clamp which is fixed to said turbine wheel shell in a holding area which is radially displaced from said farthest axial extension.

2. A hydraulic clutch as in claim 1 wherein said holding area is arranged radially outside of said farthest axial extension of said turbine wheel shell.

3. A hydraulic clutch as in claim 1 wherein said holding area is arranged radially inside of said farthest axial extension of said turbine wheel shell.

4. A hydraulic clutch as in claim 1 wherein said holding clamp is welded to said turbine wheel shell.

5. A hydraulic clutch as in claim 1 wherein said connection element is welded to said turbine wheel shell.

6. A hydraulic clutch as in claim 3 wherein said holding clamp and said connection element are welded to said turbine wheel shell along a common weld.

7. A hydraulic clutch as in claim 1 wherein said torsional vibration damper is arranged radially inside of said farthest axial extension of said turbine wheel shell.

8. A hydraulic clutch as in claim 1 wherein said torsional vibration damper comprises two coil springs nested one inside the other.

9. A hydraulic xlutch as in claim 1 wherein said connection element engages directly in said torsional vibration damper.

10. A hydraulic clutch as in claim 1 further comprising an engagement element which engages directly in said torsional vibration damper, said connection element acting on said engagement element.

11. A hydraulic clutch as in claim 10 wherein said connection element interlocks with said engagement element.

12. A hydraulic clutch as in claim 10 wherein said engagement element has a bend.

13. A hydraulic clutch as in claim 1 wherein said holding clamp has a radial bend.

14. A hydraulic clutch as in claim 1 wherein said lockup clutch comprises a plurality of said clutch disks arranged axially one behind the other.

15. A hydraulic clutch as in claim 1 further comprising
a drive-side housing element fixed with respect to said impeller, and
a rolling bearing arranged between said turbine wheel hub and said drive-side housing element.

16. A hydraulic clutch as in claim 15 wherein said rolling bearing comprises a grooved ball bearing.

17. A hydraulic clutch as in claim 1 further comprising
a stator wheel hub, and
a rolling bearing arranged between said turbine wheel shell and said stator wheel hub.

18. A hydraulic clutch as in claim 17 wherein said rolling bearing is a needle bearing.

19. A hydraulic clutch as in claim 1 further comprising an axial sliding bearing arranged between said turbine wheel hub and said turbine wheel shell.

20. A hydraulic clutch as in claim 17 further comprising an axial sliding bearing arranged between said turbine wheel hub and said turbine wheel shell, said rolling bearing being axially aligned with said axial sliding bearing.

21. A hydraulic clutch as in claim 19 wherein said turbine wheel hub has a first portion and a second portion, said turbine wheel shell and said turbine wheel hub being further apart at said second portion than at said first portion, said axial sliding bearing being arranged at said second portion.

22. A hydraulic clutch as in claim 21 wherein said second portion is arranged radially inside of said first portion.

23. A hydraulic clutch as in claim 1 further comprising a radial sliding bearing arranged between said turbine wheel hub and said turbine wheel shell.

24. A hydraulic clutch as in claim 23 wherein said turbine wheel shell extends radially inward of said turbine wheel hub in the area of said radial sliding bearing.

25. A hydraulic clutch as in claim 23 wherein said turbine wheel shell has a curve located radially outward of said radial sliding bearing.

26. A hydraulic clutch as in claim 19 further comprising a radial sliding bearing arranged between said turbine wheel hub and said turbine wheel shell, said radial sliding bearing being radially offset from said axial sliding bearing.

27. A hydraulic clutch as in claim 19 further comprising a radial sliding bearing arranged between said turbine wheel hub and said turbine wheel shell, said radial sliding bearing being axially offset from said axial sliding bearing.

28. A hydraulic clutch as in claim 19 further comprising a radial sliding bearing arranged between said turbine wheel hub and said turbine wheel shell, said axial sliding bearing extending farther radially inward than said radial sliding bearing.

29. A hydraulic clutch as in claim 1 wherein said at least one clutch disk is axially movable and rotationally substantially fixed with respect to said disk carrier.

* * * * *